US011663048B2

(12) United States Patent
Chaganti et al.

(10) Patent No.: US 11,663,048 B2
(45) Date of Patent: May 30, 2023

(54) ON-PREMISES TO CLOUD WORKLOAD MIGRATION THROUGH CYCLIC DEPLOYMENT AND EVALUATION

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 366 days.

(21) Appl. No.: 17/131,491

(22) Filed: Dec. 22, 2020

(65) Prior Publication Data

US 2022/0197695 A1 Jun. 23, 2022

(51) Int. Cl.
*G06F 9/50* (2006.01)
*G06F 9/48* (2006.01)
*G06F 11/34* (2006.01)

(52) U.S. Cl.
CPC .......... *G06F 9/5072* (2013.01); *G06F 9/4856* (2013.01); *G06F 9/5077* (2013.01); *G06F 11/3409* (2013.01)

(58) Field of Classification Search
CPC .... G06F 9/5072; G06F 9/4856; G06F 9/5077; G06F 11/3409; G06F 9/5088
See application file for complete search history.

(56) References Cited

U.S. PATENT DOCUMENTS

| | | | |
|---|---|---|---|
| 9,426,030 B1 * | 8/2016 | Anerousis | H04L 41/08 |
| 10,382,353 B1 * | 8/2019 | Krishnan | G06F 3/04847 |
| 2014/0136668 A1 * | 5/2014 | Brunswig | G06F 9/5072 709/222 |
| 2014/0229607 A1 * | 8/2014 | Jung | H04L 43/20 709/224 |
| 2015/0019301 A1 * | 1/2015 | Jung | G06Q 10/06393 705/7.39 |
| 2017/0024396 A1 * | 1/2017 | Adarsh | G06F 16/24578 |
| 2018/0159727 A1 * | 6/2018 | Liu | H04L 41/145 |
| 2019/0065221 A1 * | 2/2019 | Chauhan | G06F 9/5072 |
| 2019/0179725 A1 * | 6/2019 | Mital | G06F 11/3442 |
| 2020/0110691 A1 * | 4/2020 | Bryant | G06F 11/3414 |
| 2020/0304571 A1 * | 9/2020 | Ranjan | H04L 41/0896 |
| 2021/0160191 A1 * | 5/2021 | Ghosh | H04L 41/147 |
| 2022/0067106 A1 * | 3/2022 | Saez | G06F 9/5072 |

* cited by examiner

*Primary Examiner* — Benjamin C Wu
(74) *Attorney, Agent, or Firm* — Chamberlain, Hrdlicka, White, Williams & Aughtry

(57) ABSTRACT

A method and system for on-premises to cloud workload migration through cyclic deployment and evaluation. Existing processes for transferring on-premises workloads onto the public cloud are often painstakingly manual and laborious, in order to ensure proper workload interoperability between the different infrastructures. To address this existing dilemma in inter-infrastructure workload migration, the disclosed method and system employs a cyclic monitoring, deploying, and evaluating scheme to automate and implement optimal strategies for migrating on-premises workloads onto public and/or hybrid cloud computing environments.

20 Claims, 5 Drawing Sheets

ON-PREMISES TO CLOUD WORKLOAD MIGRATION THROUGH CYCLIC DEPLOYMENT AND EVALUATION

BACKGROUND

Existing processes for transferring on-premises workloads onto the public cloud are often painstakingly manual and laborious, in order to ensure proper workload interoperability between the different infrastructures.

SUMMARY

In general, in one aspect, the invention relates to a method for on-premises to cloud workload migration. The method includes collecting, while a workload is deployed on an on-premises infrastructure, on-premises information pertinent to the workload, generating a set of cloud model recommendations based on the on-premises information, selecting a cloud model from the set of cloud model recommendations, deploying, using the cloud model, the workload onto a testing cloud infrastructure, tuning the cloud model until an optimal cloud model is obtained, and migrating, using the optimal cloud model, the workload onto a public cloud infrastructure.

In general, in one aspect, the invention relates to a non-transitory computer readable medium (CRM). The non-transitory CRM includes computer readable program code, which when executed by a computer processor, enables the computer processor to collect, while a workload is deployed on an on-premises infrastructure, on-premises information pertinent to the workload, generate a set of cloud model recommendations based on the on-premises information, select a cloud model from the set of cloud model recommendations, deploy, using the cloud model, the workload onto a testing cloud infrastructure, tune the cloud model until an optimal cloud model is obtained, and migrate, using the optimal cloud model, the workload onto a public cloud infrastructure.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for on-premises to cloud workload migration through cyclic deployment and evaluation. Existing processes for transferring on-premises workloads onto the public cloud are often painstakingly manual and laborious, in order to ensure proper workload interoperability between the different infrastructures. To address this existing dilemma in inter-infrastructure workload migration, the disclosed method and system employs a cyclic monitoring, deploying, and evaluating scheme to automate and implement optimal strategies for migrating on-premises workloads onto public and/or hybrid cloud computing environments.

Figure 1A:
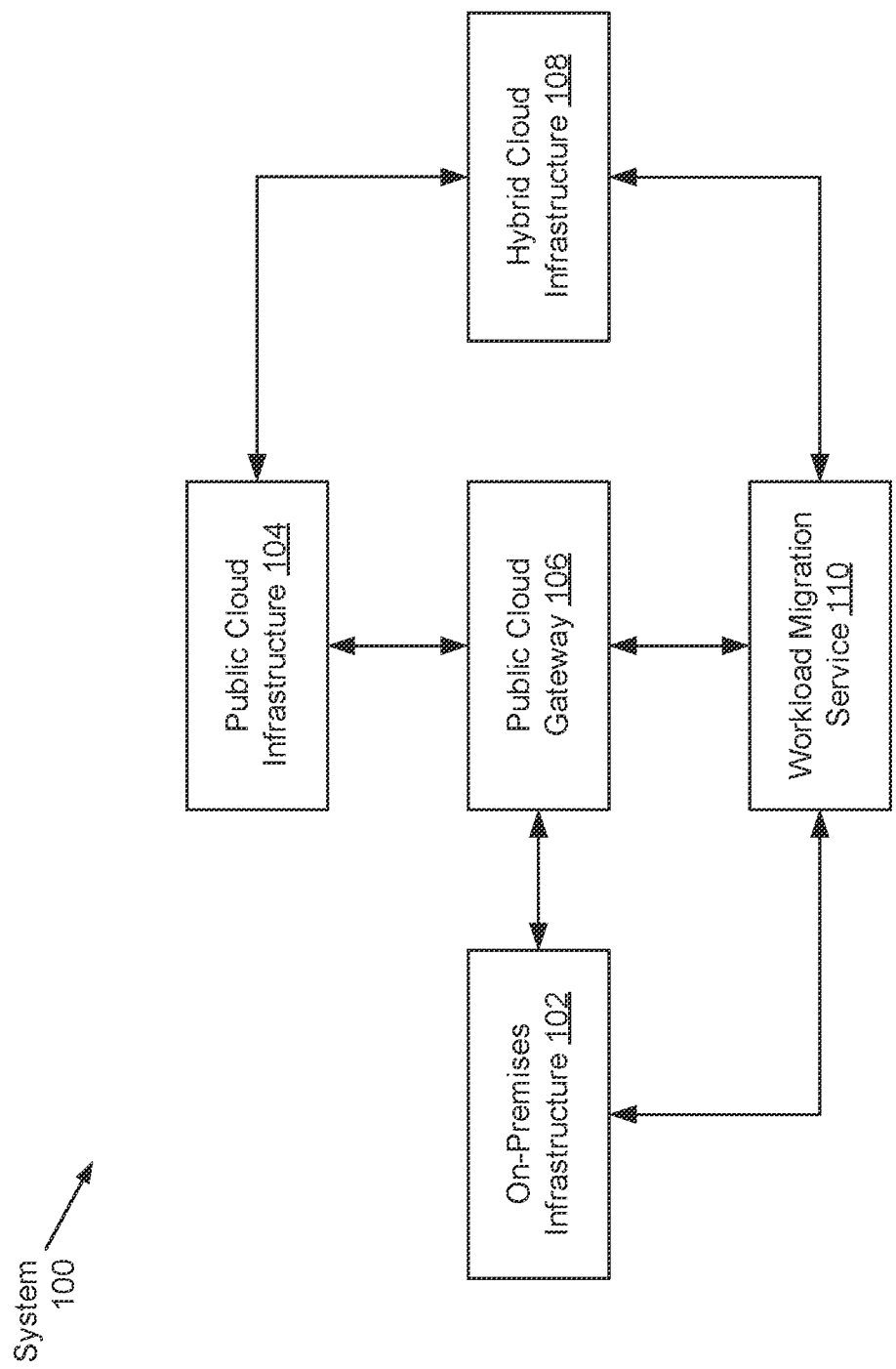
FIG. 1A shows a system in accordance with one or more embodiments of the invention.

FIG. 1A shows a system in accordance with one or more embodiments of the invention. The system (100) may include on-premises infrastructure (102), public cloud infrastructure (104), a public cloud gateway (106), hybrid cloud infrastructure (108), and a workload migration service (110). Each of these system (100) components is described below.

In one embodiment of the invention, on-premises infrastructure (102) (also referred to as a data center) may represent any privately owned and maintained enterprise information technology (IT) environment. On-premises infrastructure (102) may include any number and any configuration of physical servers, storage systems, network security appliances, management systems, application or service delivery controllers, routers, switches, and other known data center sub-systems. Any subset of the on-premises infrastructure (102) may be implemented using computing systems similar to the exemplary computing system shown in FIG. 3. Furthermore, the on-premises infrastructure (102) may include functionality to host one or more workloads (described below), which may be implemented and offered locally or over a network.

In one embodiment of the invention, a workload (not shown) may refer to an allocation of IT resources, in addition to computer readable program code and data, which may collectively support a defined process, such as an application or a service. The aforementioned IT resources may include, but are not limited to, compute resources (e.g., computer processors and memory), storage resources (e.g., temporary and/or persistent storage), and networking resources (e.g., bandwidth). Further, examples of a workload may include, but are not limited to, a virtual machine, a container, a database, a web server, and a collection of micro-services.

In one embodiment of the invention, public cloud infrastructure (104) (also referred to as the public cloud) may represent a virtual pool of IT resources and/or computing services, which may be offered by third-party providers over the public Internet to multiple tenants or clients. Any given third-party provider may implement any given portion of the public cloud (104) using groups of data centers that may be partitioned, through virtualization, and shared amongst the multiple tenants/clients. The public cloud (104) may also include functionality to host one or more workloads (described above), which may be instantiated natively or ported from another infrastructure (i.e., on-premises infrastructure (102) or hybrid cloud infrastructure (108)).

In one embodiment of the invention, the complexity associated with the portability of any given workload onto the public cloud (104) (or the hybrid cloud infrastructure (108) (described below)) may rely on various considerations. These considerations may include, but are not limited to: the networking and storage requirements (indicated through a network topology configuration and historical resource utilization metrics) associated with the given workload; the workload configuration based on the tier-architecture associated with the given workload; the selection of a cloud service model (also referred to as a cloud model) wherein the given workload may be ported; environmental, management, and/or external dependency information; and cost and/or performance considerations. Additional or alternative considerations may be used without departing from the scope of the invention.

In one embodiment of the invention, the public cloud gateway (106) may represent any physical (or hardware-based) appliance configured to provide connectivity between the public cloud (104) and management components (not shown) of the on-premises infrastructure (102), or the workload migration service (110). In such an embodiment, the public cloud gateway (106) may be implemented using a network device (i.e., switch, router, or multi-layer switch), a server, or a computing system similar to the exemplary computing system shown in FIG. 3. In another embodiment of the invention, the public cloud gateway (106) may be implemented as a virtual (or software-based) appliance, which may execute on the underlying hardware of a physical hosting device. Furthermore, the public cloud gateway (106) may include functionality to provide basic protocol translation, thereby allowing incompatible technologies (amongst the on-premises infrastructure (102), the public cloud infrastructure (104), and the workload migration service (110)) to communicate. One of ordinary skill will appreciate that the public cloud gateway (106) may perform other functionalities without departing from the scope of the invention.

In one embodiment of the invention, hybrid cloud infrastructure (108) (also referred to as the hybrid cloud) may represent a composition computing, storage, and services environment that combines two or more IT platforms. Specifically, the hybrid cloud (108) may integrate on-premises infrastructure (102) with resources and services provided through public cloud infrastructure (104), and possibly, private cloud infrastructure (not shown). Private cloud infrastructure may refer to a cloud computing environment that offers services to a private organization, rather than the general public, either over the Internet or a private internal network. The hybrid cloud (108) may also integrate orchestration and management tools in order to facilitate the sharing of resources and deployment of workloads thereacross.

In one embodiment of the invention, the workload migration service (110) may represent a data center or cloud service configured for inter-infrastructure workload migration. To that extent, the workload migration service (110) may include functionality to at least perform the method, for on-premises to cloud workload migration through cyclic deployment and evaluation, outlined in FIG. 2A, as well as the method, for tuning cloud models, outlined in FIG. 2B, below. One of ordinary skill will appreciate that the workload migration service (110) may perform other functionalities without departing from the scope of the invention. Furthermore, the workload migration service (110) may be implemented using one or more servers (not shown). Each server may represent a physical or virtual server, which may reside in a data center or a cloud computing environment. Additionally, or alternatively, the workload migration service (110) may be implemented using one or more computing systems similar to the exemplary computing system shown in FIG. 3. Moreover, the workload migration service (110) is described in further detail in FIG. 1B, below.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, other gateways, etc.) that may facilitate communications between the above-mentioned system (100) components. Moreover, in communicating with one another, the above-mentioned system (100) components may employ any combination of wired and/or wireless communication protocols.

While FIG. 1A shows a configuration of components, other system (100) configurations may be used without departing from the scope of the invention.

Figure 1B:
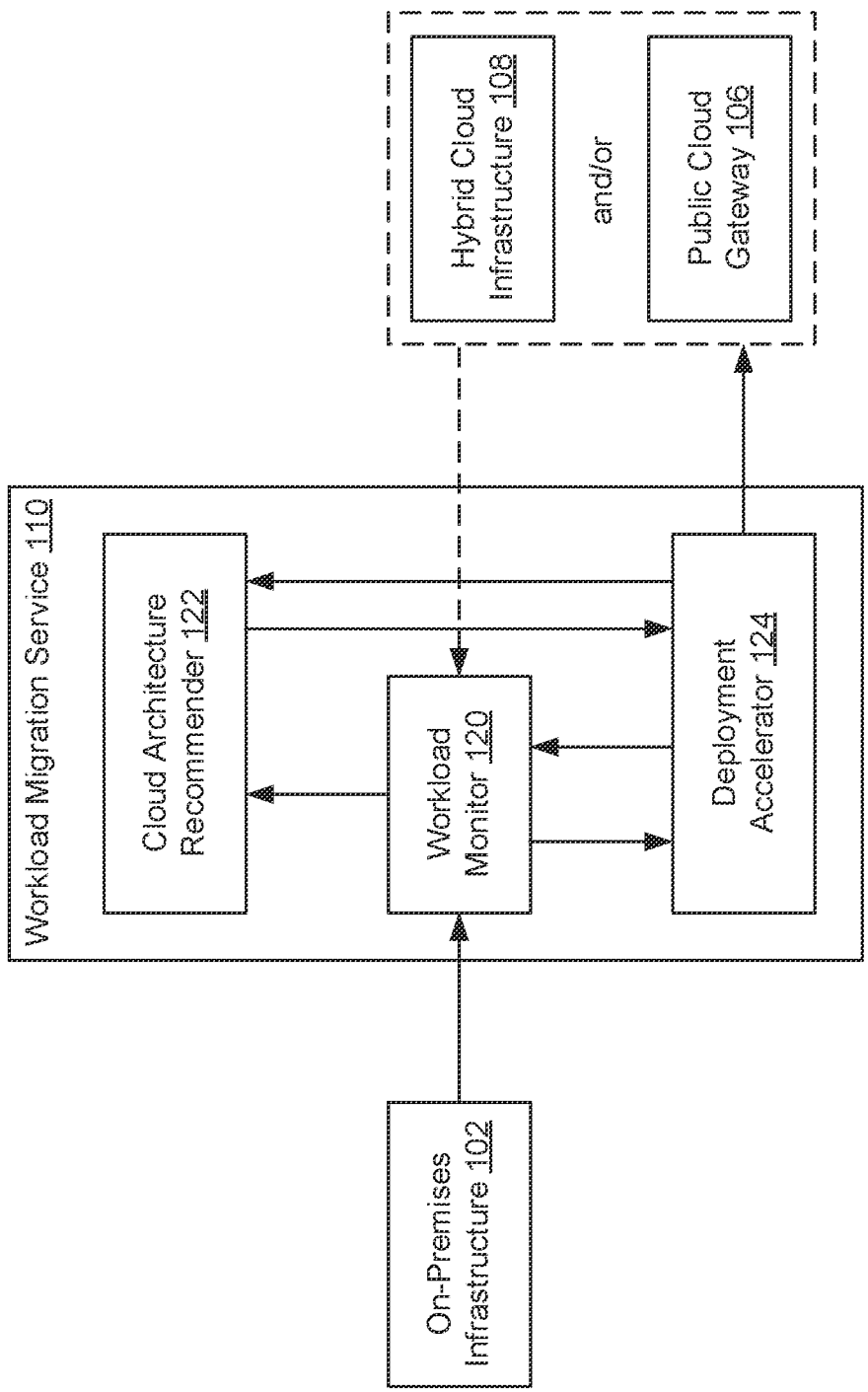
FIG. 1B shows a workload migration service in accordance with one or more embodiments of the invention.

FIG. 1B shows a workload migration service in accordance with one or more embodiments of the invention. The workload migration service (110) may include a workload monitor (120), a cloud architecture recommender (122), and a deployment accelerator (124). Each of these workload migration service (110) subcomponents is described below.

In one embodiment of the invention, the workload monitor (120) may refer to a computer program that executes on the underlying hardware of the workload migration service (110). Further, the workload monitor (120) may be responsible for workload information and metrics gathering. To that extent, the workload monitor (120) may include functionality to: identify one or more on-premises workloads (or workloads operating on on-premises infrastructure (102)), which may have been selected for migration by an administrator; obtain on-premises information (described below) pertinent to the identified on-premises workload(s); provide the obtained on-premises information to the cloud architecture recommender (122) for processing; receive notifications, from the deployment accelerator (124), indicating that the identified on-premises workload(s) have been deployed onto a testing cloud infrastructure (the hybrid cloud infrastructure (108) if available; otherwise, the public cloud infrastructure (104)), thus becoming cloud workload(s); in response to the received notifications, collect performance metrics associated with the deployed cloud workload(s); and provide the collected performance metrics, associated with the deployed cloud workload(s), to the deployment accelerator (124) for processing.

Furthermore, in one embodiment of the invention, the workload monitor (120) may continue to monitor any deployed cloud workload(s) (throughout a tuning process consisting of one or more cloud workload redeployments onto the testing cloud infrastructure using different cloud models (described below)) until notified by the deployment accelerator (124) to cease observation and data collection operations. Moreover, one of ordinary skill will appreciate that the workload monitor (120) may perform other functionalities without departing from the scope of the invention.

In one embodiment of the invention, the above-mentioned on-premises information, pertinent to any given on-premises workload, may include a layer-architecture configuration associated with the given on-premises workload. The layer-architecture configuration may outline and describe the logical separation of the given on-premises workload into multiple layers (or modules) of logical computing—each of which may be responsible for performing a given subset of the functionalities of the given on-premises workload. Examples of the aforementioned layers may include, but are not limited to: a presentation layer directed to content conveyance, a user interface (UI) layer directed to user interaction interpretation, a logic layer directed to data validation and/or processing, a data access layer directed to data retrieval and/or manipulation, and a data storage layer directed to data persistence. Further, additional layers, alternative layers, or any combination of layers into composite layers, may be used without departing from the scope of the invention.

In one embodiment of the invention, the above-mentioned on-premises information, pertinent to any given on-premises workload, may further include a tier-architecture configuration associated with the given on-premises workload. The tier-architecture configuration may outline and describe the physical separation of the given on-premises workload into one or more tiers of physical computing—each of which may host a subset (or all) of the specified logical computing layers (described above) of the given on-premises workload. In a single-tier architecture configuration, for example, all logical computing layers of the given on-premises workload may be deployed (or co-located) on a single server. In a multi-tier (or N-tier) architecture configuration, on the other hand, the varying logical computing layers of the given on-premises workload may be distributed across two or more servers—e.g., in a 3-tier architecture configuration: the presentation and UI layers may be grouped into and implemented via a first tier or a first server, the logic and data access layers may be grouped into and implemented via a second tier or a second server, and the data storage layer may be implemented via a third tier or a third server.

In one embodiment of the invention, the above-mentioned on-premises information, pertinent to any given on-premises workload, may further include a resource requirements configuration associated with the given on-premises workload. The resource requirements configuration may outline and detail compute resource requirements, storage resource requirements, and network resource requirements for implementing and/or supporting the given on-premises workload (or a portion thereof) on each specified physical computing tier (described above) of the given on-premises workload. Computing resource requirements may, for example, specify the physical or virtual type (e.g., central processing unit or graphics processing unit) of computer processor and the number of cores thereof allocated to each physical computing tier, as well as the physical or virtual type (e.g., volatile or non-volatile) of computer memory and the number of bytes thereof allocated to each physical computing tier. Meanwhile, storage resource requirements may, for example, specify the storage topology of (i.e., protocols, transport mechanisms, physical connections, etc. employed between) physical and/or virtual data stores allocated to each physical computing tier, as well as the physical or virtual type (e.g., hard disk drive or solid state drive) of computer storage, the number of disks/volumes and the class (e.g., capacity or caching) thereof allocated to each physical computing tier. Further, network resource requirements may, for example, specify the network topology of (i.e., protocols, transport mechanisms, physical connections, etc. employed between) physical and/or virtual network adapters amongst and/or between each physical computing tier, network security requirements for securing each physical computing tier (and communications there-between), as well as the networking bandwidth allocated to each physical computing tier. Moreover, one of ordinary skill will appreciate that additional or alternative compute, storage, and network requirements may be used without departing from the scope of the invention.

In one embodiment of the invention, the above-mentioned on-premises information, pertinent to any given on-premises workload, may further include historical resource utilization and/or performance metrics associated with the given on-premises workload. Historical metrics, in general, may refer to a collection of real-time metrics captured or recorded over an extended period of time. Further, the historical resource utilization and/or performance metrics, associated with the given on-premises workload, may include a collection thereof recorded for each specified physical computing tier (described above) of the given on-premises workload. Examples of resource utilization and/or performance metrics may include, but are not limited to, compute resource usage and/or performance metrics (e.g., percentage of allocated computer processor cores used, percentage of allocated computer memory bytes used, etc.), storage resource usage and/or performance metrics (e.g., percentage of allocated disk space used, disk latency, disk input-output operations per second, disk throughput, etc.), and network resource usage and/or performance metrics (e.g., percentage of allocated network bandwidth used, network path speed or latency, network packet loss rate, network throughput, etc.). One of ordinary skill will appreciate that additional or alternative resource utilization and/or performance metrics may be used without departing from the scope of the invention.

In one embodiment of the invention, the above-mentioned on-premises information, pertinent to any given on-premises workload, may further include dependency mapping(s) (if any) associated with the given on-premises workload. A dependency mapping may refer to location information (e.g., local physical memory/storage address, local logical directory path, or remote uniform resource locator/identifier), as well as interaction protocol(s), required for accessing a data library, a computer readable program code library, a service, another workload, or any other resource that the given on-premises workload may depend upon for proper functionality. Furthermore, any given dependency mapping may fall under one of various dependency classes—of which may include, but are not limited to, a transactional dependency class reflecting dependencies between the specified physical computing tier(s) (described above) of the given on-premises workload, a service dependency class reflecting dependencies between the specified logical computing layers (described above) of the given on-premises workload and infrastructure services (e.g., domain name system (DNS), lightweight directory access protocol (LADP), network file system (NFS), etc.), a system dependency class reflecting dependencies between the specified logical computing layers of the given on-premises workload and their respective host server or computing system, a library dependency class reflecting dependencies between the specified logical computing layers of the given on-premises workload and local or remote software libraries, and an inter-workload dependency class reflecting dependencies between the specified logical computing layers of the given on-premises workload and one or more other on-premises (or other infrastructure based) workloads. One of ordinary skill will appreciate that additional or alternative dependency classes may be used without departing from the scope of the invention.

In one embodiment of the invention, the cloud architecture recommender (122) may refer to a computer program that executes on the underlying hardware of the workload migration service (110). The cloud architecture recommender (122) may be responsible for cloud service model (or cloud model) (described below) selection. To that extent, the cloud architecture recommender (122) may include functionality to: obtain on-premises information (described above) pertinent to one or more on-premises workloads from the workload monitor (120); interact with the hybrid cloud infrastructure (108) (if available) and/or the public cloud infrastructure (104) (via the public cloud gateway (106)) using respective application programming interface(s) (API) to identify the varying cloud models offered thereon; recommend one or more cloud models (i.e., cloud model recommendation(s)) from the identified, offered cloud models based on the translation of the obtained on-premises information to available features, components, and/or functionalities of the offered cloud models; select a cloud model from recommended set of cloud models based on cost, management overhead, service level agreement (SLA) compliance, any other criteria, or a combination thereof; and provide the selected cloud model to the deployment accelerator (124) for processing. The cloud architecture recommender (122) may also include functionality to recommend one or more cloud models based on performance metric differences discovered between deployed cloud workload(s) and on-premises workload(s). Moreover, one of ordinary skill will appreciate that the cloud architecture recommender (122) may perform other functionalities without departing from the scope of the invention.

In one embodiment of the invention, a cloud model may refer to a service delivered through resources available and offered on cloud based infrastructure (e.g., hybrid cloud infrastructure (108) or public cloud infrastructure (104)). The extent of resources provided by cloud vendors, as well as the amount of control or management responsibilities that a subscriber or user wishes for, may depend on the type or class of the cloud model. Examples of a cloud model may include, but are not limited to, an infrastructure as a service (IaaS), a platform as a service (PaaS), and a software as a service (SaaS). Through the IaaS cloud model, cloud vendors may own (and may be responsible for managing) any physical IT infrastructure (e.g., compute resources, storage resources, and network resources) and any network security employed there-throughout, whereas the subscribers may be responsible for managing operating systems, databases, business intelligence services, development tools, middleware, and hosted applications (e.g., workloads). Through the PaaS cloud model, in addition to the aforementioned resources offered via the IaaS cloud model, cloud vendors may further own (and may further be responsible for managing) operating systems, databases, business intelligence services, development tools, and middleware, whereas the subscribers may only be responsible for managing their hosted applications. Lastly, through the SaaS cloud model, all of the aforementioned resources (including the hosted applications) may be owned and managed by the cloud vendors, whereas the subscribers may be responsible for managing nothing One of ordinary skill will appreciate that additional or alternative cloud model types may be used without departing from the scope of the invention.

In one embodiment of the invention, the deployment accelerator (124) may refer to a computer program that executes on the underlying hardware of the workload migration service (110). The deployment accelerator (124) may be responsible for cyclic workload deployment and evaluation. To that extent, the deployment accelerator (124) may include functionality to: obtain a selected cloud model (described above) from the cloud architecture recommender (122); convert the obtained cloud model into a deployable artifact package (described below); deploy the deployable artifact package (and thereby, the workload(s) via the cloud model) onto a testing cloud infrastructure (i.e., the hybrid cloud infrastructure (108) if available, or the public cloud infrastructure (104)); invoke the workload monitor (120) to collect performance metrics pertinent to the workload(s) while deployed on the testing cloud infrastructure; tune the cloud model for optimal performance based on the iterative assessment of the collected performance metrics (see e.g., FIG. 2B) against similar performance metrics collected for the workload(s) while deployed on the on-premises infrastructure (102), to obtain an optimal cloud model; and migrate the workload(s) from the testing cloud infrastructure to the public cloud infrastructure (104) using a deployable artifact package for the obtained optimal cloud model. Further, one of ordinary skill will appreciate that the deployment accelerator (124) may perform other functionalities without departing from the scope of the invention.

In one embodiment of the invention, a deployable artifact package may refer to a logical container (e.g., an archive file or an executable binary file) through which a collection of components, necessary to the integration of a cloud model onto a desired cloud infrastructure, may be contained. Ideally, any deployable artifact package should be cross-cloud compatible, thereby allowing any deployable artifact package to implement an associated cloud model across different cloud infrastructures. Further, the aforementioned collection of components may include, but are not limited to: one or more deployment artifacts (i.e., computer readable program code outputted from one or more software build processes, respectively) pertinent to implementing the cloud model; one or more dependency mappings (if any) linking the aforementioned deployment artifact(s); and computer readable program code responsible for orchestrating the proper integration of the cloud model onto the desired cloud infrastructure. One of ordinary skill will appreciate that additional or alternative components may be contained within a deployable artifact package without departing from the scope of the invention.

While FIG. 1B shows a configuration of subcomponents, other workload migration service (110) configurations may be used without departing from the scope of the invention.

Figure 2A:
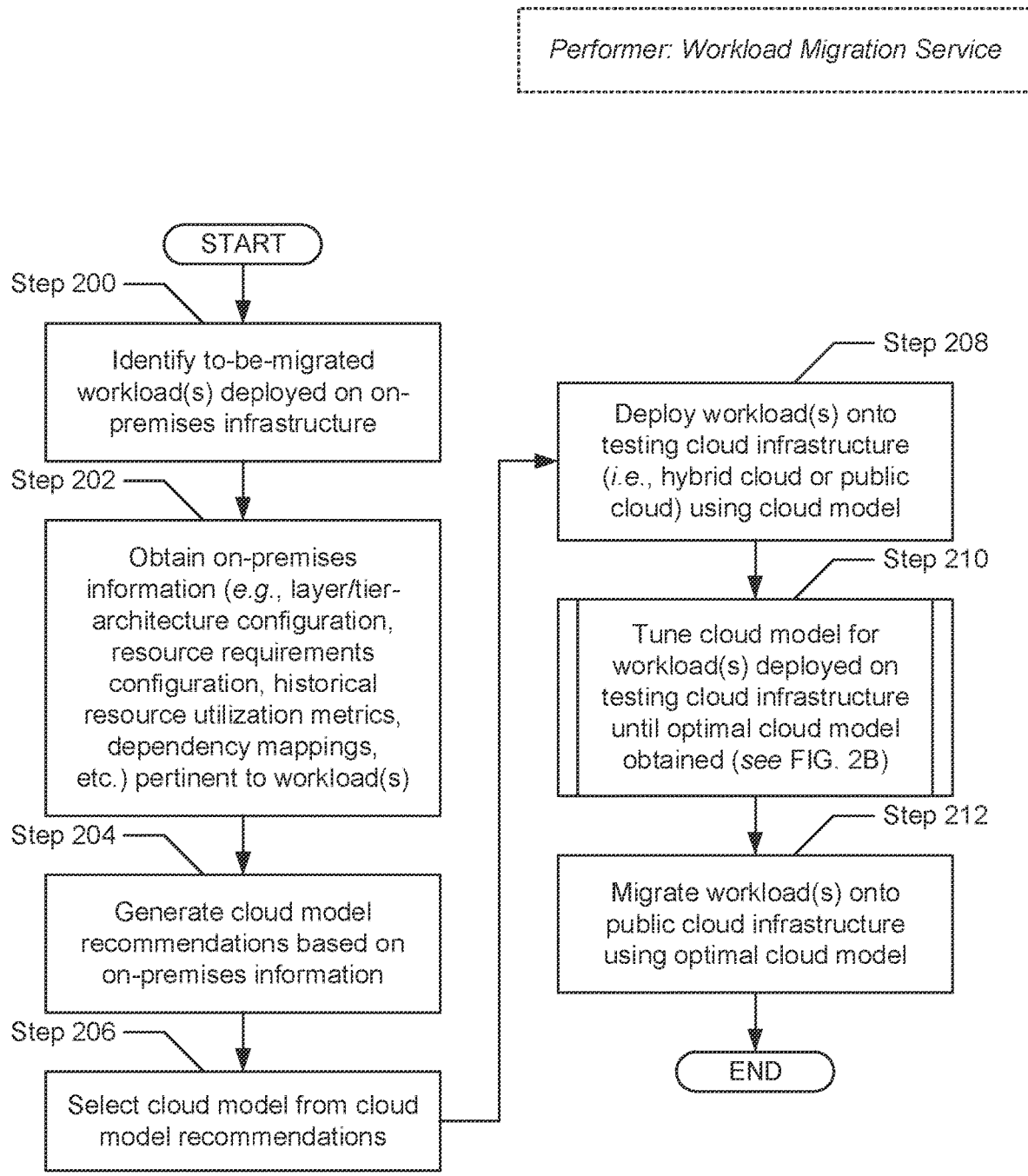
FIG. 2A shows a flowchart describing a method for on-premises to cloud workload migration through cyclic deployment and evaluation in accordance with one or more embodiments of the invention.

FIG. 2A shows a flowchart describing a method for on-premises to cloud workload migration through cyclic deployment and evaluation in accordance with one or more embodiments of the invention. The various steps outlined below may be performed by the workload migration service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, one or more workloads is/are identified for migration. In one embodiment of the invention, the workload(s) may reside and operate on on-premises infrastructure (described above) (see e.g., FIG. 1A).

In Step 202, on-premises information, pertinent to the workload(s) (identified in Step 200), is obtained. In one embodiment of the invention, the on-premises information, for each identified workload, may include: (a) a layer-architecture configuration outlining and describing the logical separation of the workload into multiple layers (or modules) of logical computing; (b) a tier-architecture configuration outlining and describing the physical separation of the s workload into one or more tiers of physical computing; (c) a resource requirements configuration outlining and detailing compute resource requirements, storage resource requirements, and network resource requirements for implementing and/or supporting the workload (or a portion thereof) on each specified physical computing tier of the workload; (d) historical resource utilization and/or performance metrics recorded for each specified physical computing tier of the workload; and (e) one or more dependency mappings (if any) referencing location information, as well as interaction protocol(s), required for accessing a data library, a computer readable program code library, a service, another workload, or any other resource that the workload may depend upon for proper functionality. On-premises information is described in further detail in the description of FIG. 1B, above.

In Step 204, a set of cloud model recommendations is generated based on the on-premises information (obtained in Step 202). Specifically, in one embodiment of the invention, any subset or all of the on-premises information, for a given workload, may be analyzed, and compared against available cloud computing resources, to ascertain one or more cloud models best-suited for implementing and/or supporting the given workload in a cloud computing environment. For example, the resource requirements configuration, as well as the historical resource utilization metrics, of the on-premises information may be collectively used, at least in part, to calculate virtual storage and virtual network configurations, which may be accommodated by one or more cloud model types (e.g., IaaS, PaaS, SaaS, etc.).

In Step 206, a cloud model is selected from the set of cloud model recommendations (generated in Step 204). In one embodiment of the invention, selection of the cloud model may take one or more factors into consideration, including, but not limited to: cost, management overhead, service level agreement (SLA) compliance, any other criteria, or a combination thereof.

In Step 208, the workload(s) (identified in Step 200) is/are subsequently deployed onto a testing cloud infrastructure using the cloud model (selected in Step 206). In one embodiment of the invention, the testing cloud infrastructure may refer to a hybrid cloud infrastructure (if available). In another embodiment of the invention, the testing cloud infrastructure may refer to a public cloud infrastructure (if the hybrid cloud infrastructure is unavailable). Further, deployment of each workload onto the testing cloud infrastructure may entail the deployment of a respective deployable artifact package (described above) (see e.g., FIG. 1B) associated with the cloud model.

In Step 210, the cloud model (selected in Step 206, and deployed in Step 208) is tuned, until an optimal cloud model is obtained. Specifically, in one embodiment of the invention, the cloud model may be tuned through an iterative (or cyclic) process entailing cloud model deployment(s) and performance-based cloud model evaluation(s), while the workload(s) (identified in Step 200) operate on the testing cloud infrastructure. Tuning of the cloud model is described in further detail in FIG. 2B, below. Thereafter, in Step 212, using the optimal cloud model (obtained through tuning in Step 210), the workload(s) (identified in Step 200) is/are migrated to the public cloud infrastructure.

Figure 2B:
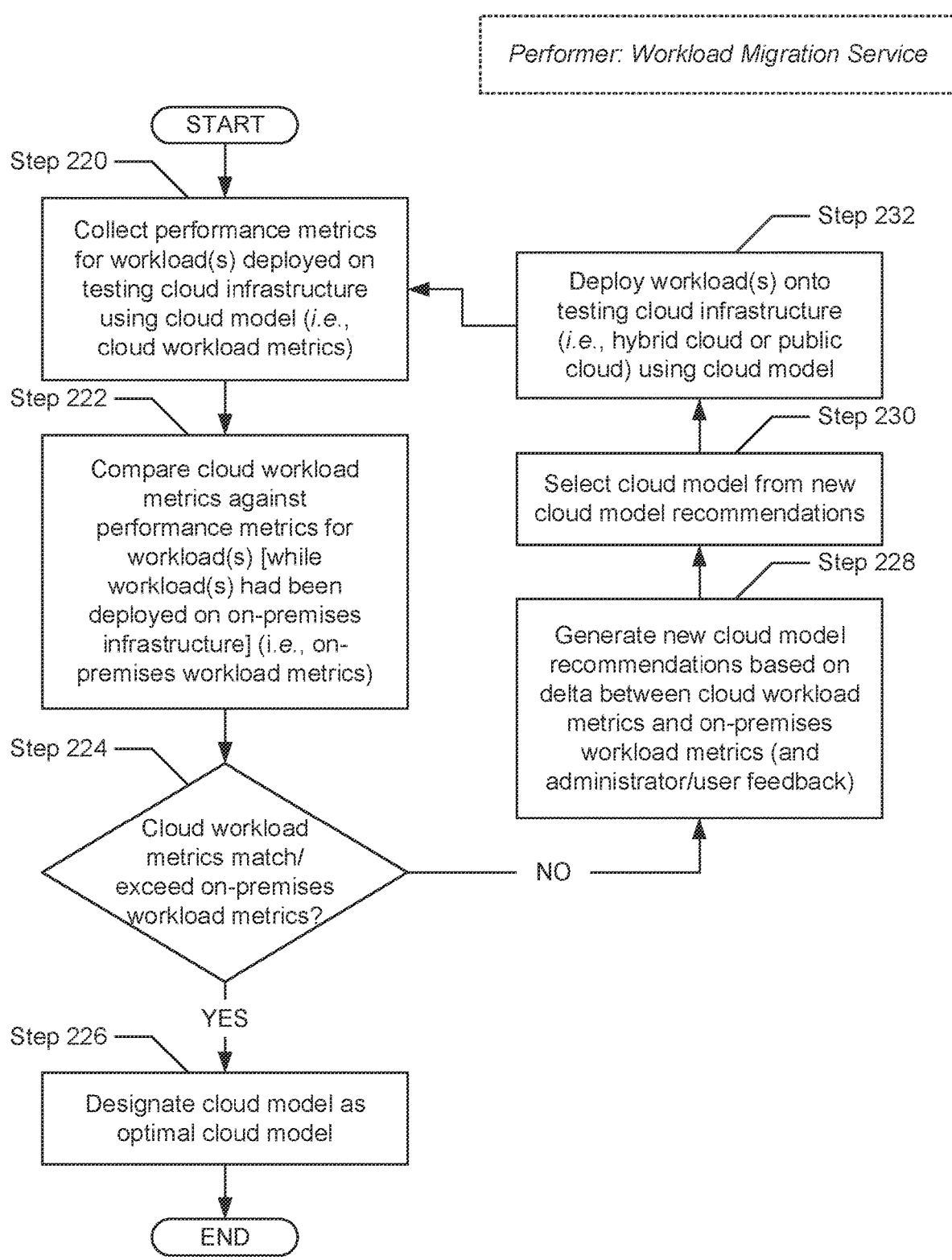
FIG. 2B shows a flowchart describing a method for tuning cloud models in accordance with one or more embodiments of the invention.

FIG. 2B shows a flowchart describing a method for tuning cloud models in accordance with one or more embodiments of the invention. The various steps outlined below may be performed by the workload migration service (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 2B, in Step 220, performance metrics (or cloud workload metrics), assessing one or more workloads, are collected while the workload(s) is/are deployed on a testing cloud infrastructure using a selected cloud model. In one embodiment of the invention, the testing cloud infrastructure may refer to a hybrid cloud infrastructure (if available). In another embodiment of the invention, the testing cloud infrastructure may refer to a public cloud infrastructure (if the hybrid cloud infrastructure is unavailable). Further, the selected cloud model may refer to a service delivered through resources available and offered on cloud based infrastructure (e.g., an infrastructure as a service (IaaS), a platform as a service (PaaS), software as a service (SaaS), etc.). Examples of the collected performance metrics are disclosed within the description of FIG. 1B, above.

In Step 222, the cloud workload metrics (collected in Step 220) are compared against similar performance metrics (or on-premises workload metrics) that assess the workload(s) while the workload(s) had been deployed on an on-premises infrastructure before their deployment on the testing cloud infrastructure. Subsequently, in Step 224, a determination is made as to whether the cloud workload metrics match or exceed the on-premises workload metrics. In one embodiment of the invention, if it is determined that the cloud workload metrics at least match the on-premises workload metrics, then the process proceeds to Step 226. On the other hand, in another embodiment of the invention, if it is alternatively determined that the on-premises workload metrics outperform the cloud workload metrics, then the process alternatively proceeds to Step 228.

In Step 226, following the determination (in Step 224) that the cloud workload metrics (collected in Step 220) at least match the on-premises workload metrics, the selected cloud model (through which the workload(s) had been deployed onto the testing cloud infrastructure) is designated as the optimal cloud model.

In Step 228, following the alternative determination (in Step 224) that the cloud workload metrics (collected in Step 220) fail to at least match the on-premises workload metrics, a new set of cloud model recommendations is generated. In one embodiment of the invention, the new set of cloud model recommendations may be generated based on a noted delta (or differences) between the cloud workload metrics and the on-premises metrics. In another embodiment of the invention, generation of the new set of cloud model recommendations may further be based on administrator or user feedback. Further, each newly recommended cloud model may reflect one or more upgraded features, components, functionalities, etc., directed to lessening the performance gap exhibited by the workload(s) while deployed on a previously recommended cloud model versus while deployed on the on-premises infrastructure.

In Step 230, a (new) cloud model is selected from the new set of cloud model recommendations (generated in Step 228). In one embodiment of the invention, selection of the (new) cloud model may take one or more factors into consideration, including, but not limited to: cost, management overhead, service level agreement (SLA) compliance, any other criteria, or a combination thereof.

In Step 232, the workload(s) is/are subsequently re-deployed onto the testing cloud infrastructure. In one embodiment of the invention, re-deployment of the workload(s) this time, however, employs a deployable artifact package (described above) (see e.g., FIG. 1B) associated with the cloud model (selected in Step 230). Hereinafter, the process proceeds to Step 220, where new performance metrics, assessing the workload(s), while the workload(s) is/are deployed on the testing cloud infrastructure using the newly selected cloud model, is collected.

Figure 3:
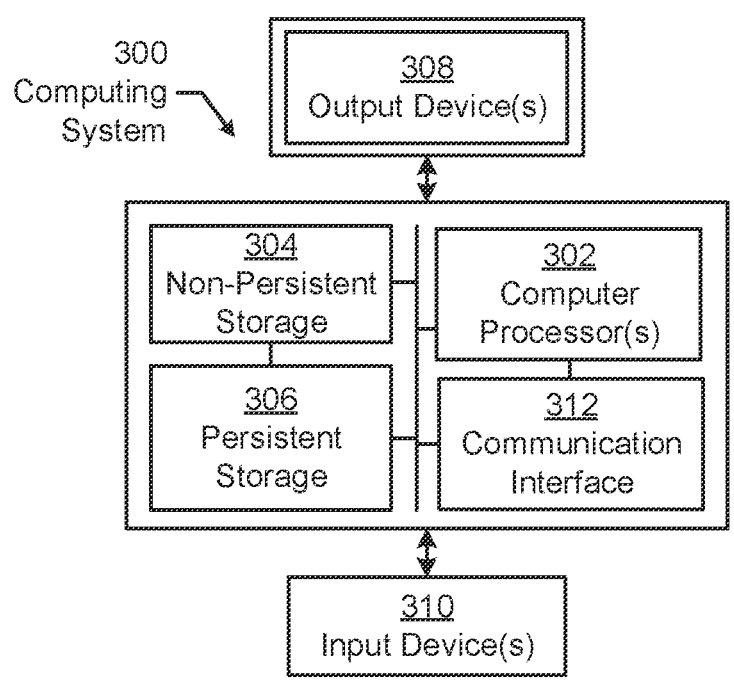
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for on-premises to cloud workload migration, comprising:
    collecting, while a workload is deployed on an on-premises infrastructure, on-premises information pertinent to the workload;
    generating a set of cloud model recommendations based on the on-premises information;
    selecting a cloud model from the set of cloud model recommendations;
    deploying, using the cloud model, the workload onto a testing cloud infrastructure;
    tuning the cloud model until an optimal cloud model is obtained; and
    migrating, using the optimal cloud model, the workload onto a public cloud infrastructure.

2. The method of claim 1, wherein the on-premises information comprises a layer-architecture configuration outlining a set of logical computing layers associated with the workload.

3. The method of claim 2, wherein the on-premises information comprises a tier-architecture configuration outlining a set of physical computing tiers associated with the workload, wherein each physical computing tier hosts at least a subset of the set of logical computing layers.

4. The method of claim 3, wherein the on-premises information further comprises a resource requirements configuration outlining information technology (IT) resources allocated to the workload on each physical computing tier of the set of physical computing tiers thereof.

5. The method of claim 3, wherein the on-premises information further comprises historical resource utilization metrics capturing a performance of each physical computing tier of the set of physical computing tiers associated with the workload.

6. The method of claim 3, wherein the on-premises information further comprises a set of dependency mappings respectively outlining a set of dependencies relied upon to implement the workload.

7. The method of claim 1, wherein the testing cloud infrastructure is one selected from a group consisting of a hybrid cloud infrastructure and the public cloud infrastructure.

8. The method of claim 1, wherein selection of the cloud model from the set of cloud model recommendations considers at least one selected from a group consisting of cost, management overhead, and service level agreement (SLA) compliance.

9. The method of claim 1, wherein the cloud model is one selected from a group consisting of an infrastructure as a service (IaaS), a platform as a service (PaaS), and a software as a service (SaaS).

10. The method of claim 1, wherein tuning the cloud model until the optimal cloud model is obtained, comprises:
while a condition is unmet, performing an iterative process, comprising:
collecting, while the workload is deployed on the testing cloud infrastructure using the cloud model, cloud workload metrics assessing a first performance of the workload thereon;
making a determination confirming that the condition is unmet;
generating, based on the determination, a new set of cloud model recommendations;
selecting a new cloud model from the new set of cloud model recommendations; and
deploying, using the new cloud model, the workload onto the testing cloud infrastructure;
when the condition is met, terminating the iterative process; and
designating the new cloud model, following a termination of the iterative process, as the optimal cloud model,
wherein the condition comprises the cloud workload metrics at least matching on-premises workload metrics assessing a second performance of the workload while the workload had been deployed on the on-premises infrastructure.

11. A non-transitory computer readable medium (CRM) comprising computer readable program code, which when executed by a computer processor, enables the computer processor to:
collect, while a workload is deployed on an on-premises infrastructure, on-premises information pertinent to the workload;
generate a set of cloud model recommendations based on the on-premises information;
select a cloud model from the set of cloud model recommendations;
deploy, using the cloud model, the workload onto a testing cloud infrastructure;
tune the cloud model until an optimal cloud model is obtained; and
migrate, using the optimal cloud model, the workload onto a public cloud infrastructure.

12. The non-transitory CRM of claim 11, wherein the on-premises information comprises a layer-architecture configuration outlining a set of logical computing layers associated with the workload.

13. The non-transitory CRM of claim 12, wherein the on-premises information comprises a tier-architecture configuration outlining a set of physical computing tiers associated with the workload, wherein each physical computing tier hosts at least a subset of the set of logical computing layers.

14. The non-transitory CRM of claim 13, wherein the on-premises information further comprises a resource requirements configuration outlining information technology (IT) resources allocated to the workload on each physical computing tier of the set of physical computing tiers thereof.

15. The non-transitory CRM of claim 13, wherein the on-premises information further comprises historical resource utilization metrics capturing a performance of each physical computing tier of the set of physical computing tiers associated with the workload.

16. The non-transitory CRM of claim 13, wherein the on-premises information further comprises a set of dependency mappings respectively outlining a set of dependencies relied upon to implement the workload.

17. The non-transitory CRM of claim 11, wherein the testing cloud infrastructure is one selected from a group consisting of a hybrid cloud infrastructure and the public cloud infrastructure.

18. The non-transitory CRM of claim 11, wherein selection of the cloud model from the set of cloud model recommendations considers at least one selected from a group consisting of cost, management overhead, and service level agreement (SLA) compliance.

19. The non-transitory CRM of claim 11, wherein the cloud model is one selected from a group consisting of an infrastructure as a service (IaaS), a platform as a service (PaaS), and a software as a service (SaaS).

20. The non-transitory CRM of claim 11, further comprising computer readable program code to tune the cloud model, which when executed by the computer processor, further enables the computer processor to:
while a condition is unmet, perform an iterative process, comprising:
collecting, while the workload is deployed on the testing cloud infrastructure using the cloud model, cloud workload metrics assessing a first performance of the workload thereon;
making a determination confirming that the condition is unmet;
generating, based on the determination, a new set of cloud model recommendations;
selecting a new cloud model from the new set of cloud model recommendations; and
deploying, using the new cloud model, the workload onto the testing cloud infrastructure;
when the condition is met, terminate the iterative process; and
designate the new cloud model, following a termination of the iterative process, as the optimal cloud model,
wherein the condition comprises the cloud workload metrics at least matching on-premises workload metrics assessing a second performance of the workload while the workload had been deployed on the on-premises infrastructure.

* * * * *